(12) United States Patent
Heulings et al.

(10) Patent No.: US 9,404,259 B2
(45) Date of Patent: Aug. 2, 2016

(54) POLYMER RUBBER COMPOSITE SHINGLES WITH HIGH SOLAR REFLECTANCE

(75) Inventors: Harry R. Heulings, Maple Shade, NJ (US); Willie Lau, Lower Gwynedd, PA (US); Joseph M. Rokowski, Barto, PA (US)

(73) Assignee: Rohm and Haas Company, Philadelphia, PA (US)

( * ) Notice: Subject to any disclaimer, the term of this patent is extended or adjusted under 35 U.S.C. 154(b) by 636 days.

(21) Appl. No.: 13/333,320

(22) Filed: Dec. 21, 2011

(65) Prior Publication Data

US 2012/0164385 A1 Jun. 28, 2012

Related U.S. Application Data

(60) Provisional application No. 61/425,903, filed on Dec. 22, 2010, provisional application No. 61/535,016, filed on Sep. 15, 2011.

(51) Int. Cl.
*E04D 1/20* (2006.01)
*C08J 3/205* (2006.01)
*C08L 17/00* (2006.01)
*C08L 25/00* (2006.01)
*C08J 7/04* (2006.01)
*C08L 19/00* (2006.01)

(52) U.S. Cl.
CPC .............. *E04D 1/20* (2013.01); *C08J 3/2053* (2013.01); *C08J 7/042* (2013.01); *C08L 17/00* (2013.01); *C08L 25/00* (2013.01); *C08J 2300/22* (2013.01); *C08J 2317/00* (2013.01); *C08K 2201/019* (2013.01); *C08L 19/003* (2013.01); *Y02B 80/34* (2013.01); *Y10T 428/2438* (2015.01)

(58) Field of Classification Search
USPC .................................................. 428/141, 143
See application file for complete search history.

(56) References Cited

U.S. PATENT DOCUMENTS

| | | | | |
|---|---|---|---|---|
| 3,869,298 | A | * | 3/1975 | Suzuki et al. ................. 106/418 |
| 4,119,759 | A | | 10/1978 | Fischer et al. |
| 5,883,182 | A | | 3/1999 | Hunt |
| 7,670,668 | B2 | | 3/2010 | Greaves et al. |
| 8,304,461 | B2 | | 11/2012 | Cruz et al. |
| 2002/0128366 | A1 | | 9/2002 | Coffey |
| 2004/0019150 | A1 | * | 1/2004 | Palenzuela Soldevila .... 524/589 |
| 2007/0110961 | A1 | | 5/2007 | Fensel et al. |
| 2007/0129483 | A1 | * | 6/2007 | James et al. ................. 524/502 |
| 2009/0241450 | A1 | | 10/2009 | Italiane et al. |
| 2009/0308009 | A1 | * | 12/2009 | Boor .......................... 52/309.13 |

FOREIGN PATENT DOCUMENTS

| | | |
|---|---|---|
| EP | 2143765 A1 | 7/2009 |
| WO | 2007064511 A1 | 6/2007 |

OTHER PUBLICATIONS

Akbari, Hashem; Levinson, Ronnen; Evolution of Cool-Roof Standards in the US, Feb. 2008, Advances in Building Energy Research, pp. 1-32.*

* cited by examiner

*Primary Examiner* — Nathan Van Sell
(74) *Attorney, Agent, or Firm* — Andrew Merriam

(57) ABSTRACT

The present invention provides shaped articles comprising one or more composite layer of (i) a vulcanizate encapsulated in a colored or uncolored thermoplastic polymer matrix containing one or more passivating agent, and (ii) a reflective material chosen from colored fluidizable particles of a thermoplastic reflective colorant encapsulated vulcanizate, roofing granules, thermoplastic encapsulated roofing granules, the colored thermoplastic polymer matrix, and combinations thereof. The articles can be laminates of colored or reflective layers on uncolored or other layers, or one or more colored layer having colored fluidizable particles are dispersed within the surface of the uppermost composite layer or having either the colored fluidizable particles or the granules are dispersed on the surface of the composite layer or are adhered thereto with a thermoplastic resin. Roofing shingles are provided.

11 Claims, No Drawings

POLYMER RUBBER COMPOSITE SHINGLES WITH HIGH SOLAR REFLECTANCE

The present invention relates to solar reflective shaped articles comprising thermoplastic polymer and vulcanizates, such as ground tire rubber, and to methods of preparing them. More specifically, the present invention relates to reflective films and multi-layer articles comprising thermoplastic polymer encapsulated vulcanizates from a waste or recycle stream and methods for forming them from shelf stable, fluidizable particles.

Waste rubber or vulcanizate, such as ground tire rubber, may retain many of the mechanical properties of new rubber; however, effective means of re-using such waste has been limited to fillers for pavement and ground cover for use in playgrounds or in landscaping materials. There remains a need to convert such waste vulcanizate to higher uses which capture more of the value of the materials in the vulcanizate.

Asphalt shingles rely on embedded granules to provide Solar Reflectance; however, the Solar Reflectance in conventional shingles is low (~20%) primarily because of the exposed black color in the background from the exposed asphalt substrate between the granules and the roughness of the shingle contributes to multiple scattering of light. Changing the color of the asphalt substrate has proven impractical because of manufacturing and material constraints; for example, it is difficult to make the color of asphalt lighter by adding white pigments such as titanium dioxide because large amounts of the pigment are required to overcome the black color of asphalt thereby adding to cost. The addition of pigments to molten asphalt also contributes to high viscosity when asphalt is processed. In addition, conventional granules for roofing shingles are generally made of ceramic; the granules do not adhere well to the shingle or substrate and the elements will remove such granules over time.

U.S. Pat. No. 7,670,668B2, to Greaves et al., discloses multilayer roof coverings made without roofing granules wherein a coated roofing mat comprises a roofing mat coated with an organic coating material, a reflective layer comprising a layer of a reflective material covering and in continuous contact with the upper surface of the roofing mat, and a weatherable layer comprising a layer of a weatherable material covering an upper surface of the reflective layer. The weatherable layer and reflective layer may be one and the same thing and may comprise a polymer, reflective pigments and opacifying agents. The coverings disclosed derive their mechanical properties from the roofing mat and not from the weatherable layer or reflective layer. Accordingly, the Greaves coverings need at least two layers, and the mechanical properties of the weatherable and reflective portions of the Greaves coverings are limited to the mechanical properties of a coating material.

The present inventors have endeavored to solve the problem of providing solar reflective shaped articles which have a durable reflective portion and which can be provided in a simple process using conventional processing equipment in the minimum possible number of composite layers.

According to the present invention, reflective or colored shaped articles comprise one or more composite layer of (i) a vulcanizate, preferably, a waste vulcanizate, such as ground tire rubber (GTR), encapsulated in a colored or uncolored thermoplastic polymer matrix containing one or more passivating agent, (ii) a reflective material chosen from colored fluidizable particles of a thermoplastic reflective colorant encapsulated vulcanizate, preferably, a waste vulcanizate, such as ground tire rubber (GTR), roofing granules, thermoplastic encapsulated roofing granules, the colored thermoplastic polymer matrix, and combinations thereof, and, (iii) optionally, including a scrim or fiber reinforcement coated with the thermoplastic polymer matrix.

In the shaped articles of the present invention, the colored fluidizable particles may be dispersed within the surface of a colored or, preferably, uncolored composite layer or either the colored fluidizable particles and/or other reflective materials are dispersed on the surface of the composite layer or are adhered thereto with a thermoplastic resin.

Likewise, in the shaped articles of the present invention, the roofing granules may be dispersed on the surface of a colored or, preferably, uncolored composite layer adhered thereto with a thermoplastic resin, or encapsulated in a thermoplastic resin which comprises a passivating agent to make thermoplastic encapsulated roofing granules which can be dispersed on the surface of the composite layer or onto a conventional shingle. The thermoplastic encapsulated roofing granules may further comprise additives such as IR reflective pigments, organic colorants or dyes, antimicrobials, such as, for example, anti-algae organic biocides, Cu or Ag particles.

The shaped articles of the present invention may comprise a laminate of one or more black layer having a reflective layer on top.

Layers or shaped articles may be made from 100% colored thermoplastic polymer encapsulated vulcanizate, i.e. from 100% colored fluidizable particles or a moist mixture wherein the solids in the moist mixture are colored thermoplastic polymer encapsulated vulcanizate; the moist mixture is moist particles.

Layers or shaped articles maybe made from black non-colored/non-colored polymer encapsulated vulcanizate, i.e. from 100% thermoplastic polymer encapsulated vulcanizate or a moist mixture containing the same.

The shaped articles of the present invention may be used as roofing shingles or a roof covering.

The shaped articles of the present invention are at least substantially plasticizer free, or contain no added plasticizer.

The shaped articles of the present invention, or any layer thereof, may comprise up to 89.95 wt. %, based on total solids, of a vulcanizate material, or waste or scrap vulcanizate, or, preferably, 50 wt. % or more, preferably, up to 79.95 wt. %, or as low as 35 wt. %.

Colored layers or shaped articles of the present invention may comprise up to 89.85 wt. %, based on total solids, of a vulcanizate material, or waste or scrap vulcanizate, or, preferably, 60 wt. % or more, preferably, up to 79.95 wt. %, or as low as 35 wt. %. Accordingly, the layers or shaped articles may comprise 100% of colored fluidizable particles or a moist mixture for making such colored fluidizable particles so long as the amount of thermoplastic polymer in the layer or article comprises 10 wt. % or more, based on the total solids in the layer or article.

The shaped articles of the present invention, or any layer thereof, may comprise from 0.05 to 3.0 wt. %, based on total solids, of one or more passivating agent, or, preferably, 0.1 wt. % or more, preferably, up to 1 wt. %.

The initial Solar Reflectance (SR) of the shaped articles of the present invention is 30% or higher, preferably, 40% or higher, or up to 90% and the initial thermal emissivity (TE) is 70% or higher, preferably, 80% or higher, or up to 95. By contrast, the initial solar reflectivity of a granulated shingle can be as low as 9%. Higher SR ratings may be obtained by using larger vulcanizate particles in a colored moist mixture or larger colored fluidizable particles, using more of such particles, by using less vulcanizate and more colorant, and by including highly solar reflective granules on the composite shaped article. Such granules are encapsulated in thermoplastic polymer comprising a passivating agent.

Further, according to the present invention, a colored fluidizable or particle each particle in a plurality thereof comprises a shelf-stable particle encapsulated in a mixture of i) a thermoplastic polymer, ii) an infrared (IR) reflective pigment, a visibly reflective pigment having a refractive index in air of 1.7 or more, or an opacifying agent, and iii) a passivating agent, such as a multivalent metal or compound, e.g. a salt or metal oxide. The passivating agent may be used in amounts of 0.1 to 3.0 wt. %, based on total particle solids, preferably, 1.0 wt. % or less.

The thermoplastic encapsulated roofing granules of the present invention comprise roofing granules encapsulated in a mixture of i) a thermoplastic polymer and ii) a passivating agent. The passivating agent may be used in amounts of 0.1 to 3.0 wt. %, based on total encapsulated granule solids, preferably, 1.0 wt. % or less. The colored fluidizable particles of the present invention are at least substantially plasticizer free, or contain no added plasticizer.

The thermoplastic encapsulated roofing granules of the present invention may or may not contain added plasticizer.

The colored fluidizable particles of the present invention may comprise from 5 to 65 wt. %, based on total solids in the colored fluidizable particles, or 49.95 wt. % or less, or, preferably, 10 wt. % or more, or, preferably, up to 30 wt. % of thermoplastic resin to insure color fastness.

The colored fluidizable particles of the present invention may comprise from 5 to 94.85 wt. %, based on total solids in the colored fluidizable particles of vulcanizate particles, or, preferably, 35 wt. % or more, or, preferably, 50 wt. %, or more, or, more preferably, up to 89.95 wt. %.

The colored fluidizable particles of the present invention may comprise from 0.05 to 3.0 wt. %, based on total solids, of one or more passivating agent, or, preferably, 0.1 wt. % or more, preferably, up to 1 wt. %.

The thermoplastic encapsulated roofing granules of the present invention further comprise from 10 to 95 wt. %, or, preferably, up to 90 wt. %, or, preferably, 50 wt. % or more of roofing granules, based on the total solids of the thermoplastic encapsulated roofing granules. The thermoplastic encapsulated roofing granules may also be colored and comprise an infrared (IR) reflective pigment, a pigment or colorant, or an opacifying agent.

To insure that they are compatible with the composite layer of the present invention, the thermoplastic encapsulated roofing granules may comprise a thermoplastic polymer comprising reactive functional groups, e.g. crosslinkable groups such as, for example, allyl or acetoacetoxy groups, can be incorporated in the thermoplastic polymer.

In yet another aspect, the present invention comprises shingles, such as shingles comprising asphalt coated glass mat, having dispersed thereon thermoplastic encapsulated roofing granules.

The shaped articles of the present invention may be formed by methods of solid phase mixing (SPM) comprising mixing i) one or more emulsion of a thermoplastic polymer, ii) particles of one or more vulcanizate having a sieve particle size of from 10 to 800 µm, preferably, 400 µm or less, or preferably, 60 µm or more, iii) from 0.05 to 3.0 wt. %, preferably, up to 1.0 wt. %, based on total solids, of a passivating agent, for example, a multivalent metal or compound, and, optionally, iv) a colorant or colorant dispersion, to form a moist mixture including thermoplastic polymer encapsulated vulcanizate, optionally, drying the moist mixture to form an fluidizable encapsulated vulcanizate particle, and thermoplastic processing the moist mixture or fluidizable encapsulated vulcanizate particles to form a composite layer, such as a sheet.

Alternatively, the moist mixture including thermoplastic polymer encapsulated vulcanizate or fluidizable encapsulated vulcanizate particles may be thermoplastically processed to form a sheet, and granules, such as colored fluidizable particles may be adhered thereto by pressing under heat, or with a clear thermoplastic adhesive, such as any thermoplastic polymer melt or emulsion.

Colored fluidizable particles for use in the composite layer or as roofing granules may be formed by SPM methods. However, the vulcanizate used to make the colored fluidizable particles has a sieve particle size of from 40 µm to 3,000 µm, preferably, 200 µm or more, or 1,200 µm or less. The resulting colored fluidizable particles may have a sieve particle size of from 50 µm to 4,000 µm.

Unless otherwise indicated, any term containing parentheses refers, alternatively, to the whole term as if no parentheses were present and the term without them (i.e. excluding the content of the parentheses), and combinations of each alternative. Thus, the term "(meth)acrylic" refers to any of acrylic, methacrylic, and mixtures thereof.

All ranges are inclusive and combinable. For example, a proportion of from 35 to 90 wt. %, based on total solids, or, preferably, 50 wt. % or more, or, preferably, up to 70 wt. %, includes ranges of from 35 to 90 wt. %, from 35 to 50 wt. %, from 35 to 70 wt. %, from 50 to 70 wt. %, from 50 to 90 wt. %, and from 70 to 90 wt. %.

As used herein, the term "acrylic" refers to materials made from a major proportion of acrylate, methacrylate, acrylic or methacrylic acid or (meth)acrolein monomers, polymers or resins.

As used herein, the phrase "aqueous" includes water and mixtures comprising 50 wt. % or more of water in a mixture of water with water-miscible solvents.

As used herein, the phrase "colorant" means a colorant, pigment or dye.

As used herein, the phrase "emulsion of a thermoplastic polymer" refers to any two phase fluid wherein the continuous phase is aqueous and the disperse phase is a thermoplastic polymer, including emulsion polymerization products and polymers emulsified in water. The phrases "emulsion" and "dispersion" can be used interchangeably.

As used herein, the phrase "fluidizable particles" refers to any composition of particles, regardless of moisture content, that can be fluidized as individual particles in a fluid bed at room temperature and pressure without further drying the particles using the fluid bed or any other drying method.

As used herein, the term "major proportion" means 50 wt. % or more of a given material or composition.

As used herein, the term "multivalent" includes divalent or higher valent moieties.

As used herein, the term "polyester" means a condensation product of polymerizing lactones, or di- or higher functional carboxylic reactants with diols or polyols.

As used herein, unless otherwise indicated, the word "polymer" includes, independently, homopolymers, copolymers, terpolymers, block copolymers, segmented copolymers, graft copolymers, and any mixture or combination thereof.

As used herein, the term "sieve particle size" refers to the particle size of a material that would completely (~100 wt. %) pass through a mesh sieve of the given particle size. For example, a sample of waste vulcanizate or GTR particles that completely pass through a 250 µm size sieve (60 mesh) is referred to as having a 250 µm sieve particle size. For a given material, a sieve particle size will be larger than the weight average particle size of the same material.

As used herein, the term "Solar Reflectance (SR)" means the reflectance of solar energy by surfaces, e.g. highly reflective (high albedo) roofs, away from the building exterior surface and away from the ambient air around the building. SR is expressed either as a decimal fraction or a percentage. SR is measured using ASTM C1549-09 (2009) Standard Test Method for Determination of Solar Reflectance Near Ambient Temperature Using a Portable Solar Reflectometer as the proportion of solar energy reflected on a scale from 0.0 (no energy reflected) to 1.0 (100% energy reflected).

As used herein, the term "Thermal Emittance (TE)" means thermal emissivity of solar energy of a surface, i.e. of a shaped article surface, expressed as the ratio of radiant heat flux emitted by a material to that emitted by a blackbody radiator at the same temperature. TE is measured using ASTM C1371-04a Standard Test Method for Determination of Emittance of Materials Near Room Temperature Using Portable Emissometers (2004) under controlled lab conditions of room temperature and 50% Relative Humidity as the relative proportion of energy that is radiated back to the atmosphere and is expressed on a scale from 0.0 to 1.0. Emissivity values may be expressed either as a decimal fraction or a percentage. Higher numbers indicate faster heat transfer.

As used herein, the term "substantially plasticizer free" refers to a composition that has no added plasticizer or which comprises less than 0.5 wt. %, or, preferably, less than 1000 ppm of any ester, phthalate, benzoate or other known plasticizer for polymers.

As used herein, unless otherwise indicated, the term "glass transition temperature" or "Tg" refers to the glass transition temperature of a material as determined by Differential Scanning calorimetry (TA Instrument model Q-1000) scanning between −90° C. to 150° C. at a rate of 20° C./min. The Tg is the inflection point of the curve.

As used herein, unless otherwise indicated, the term "calculated glass transition temperature" or "calculated Tg" refers to the glass transition temperature of a material as determined by the Fox Equation as described by Fox in *Bulletin of the American Physical Society*, 1, 3, page 123 (1956).

As used herein, the term "total solids" excludes liquids of any material or ingredient other than the ingredient for which the content is stated which may be part liquid. Thus, a mixture of 50 weight parts vulcanizate particles (at 100% solids), 0.75 weight parts passivating agent (at 100% solids), and 50 weight parts emulsion of a thermoplastic polymer (at 50% solids) comprises roughly 66%, based on total solids, of vulcanizate, 1%, based on total solids, of passivating agent and 33%, based on total solids, of thermoplastic polymer even though the same mixture comprises about 49 wt. % emulsion of thermoplastic polymer, based on total solids.

As used herein, unless otherwise indicated, the term "weight average particle size" refers to the weight average particle size of a material as determined using a light scattering technique with a Malvern Mastersizer 2000® Particle Size Analyzer (Malvern Instruments Ltd., Malvern, Worcestershire, UK). Materials can include particles which are coagulated or flocculated polymers and polymer agglomerates.

Shaped articles from thermoplastic polymer encapsulated vulcanizate particles prepared by Solid Phase Mixing (SPM) and including colored fluidizable particles of thermoplastic polymer encapsulated vulcanizate have Solar Reflectance (SR) in excess of 40% and may be further enhanced by embedding reflective granules on the surface. The materials, such as acrylic latex and GTR are weatherable and ultraviolet (UV) durable, so fewer, if any, roofing granules need be added to shingles or roof coverings according to the present invention. At the same time, the shaped articles of the present invention provide aesthetics, as a similar color and pattern as granulated shingles and allow for a much higher initial solar reflectance than its granule containing analog. Further, as the shingles are thermoplastic (without scrim), they could potentially be re-recycled. In addition, the methods of the present invention enable the making of colored fluidizable particles and shaped articles having a broad range of colors for desirable appearance, for example, to mimic visual shingle color aesthetics without using the conventional inorganic granules. The SPM methods for making the shaped articles enables use of conventional mixing equipment, such as a low shear mixer and a fluid bed dryer, and have a broad processing tolerance.

The fluidizable encapsulated vulcanizate particles, thermoplastic encapsulated roofing granules, and the colored fluidizable particles of the present invention comprise a passivating agent, which enables them as particles to fluidize in the dryer without sticking to the equipment; and they remain in a granular state after drying and during storage.

Because the thermoplastic encapsulated roofing granules do not require a silicate coating, they may include low cost additives such as opacifies that cannot be used in the high temperature processes used to make conventional roofing granules. This lowers the manufacturing cost of roofing granules by lowering energy consumption. For example, the granules can be made from ground or powdered rock or ceramic without any silicate coating or process therefor.

According to the present invention, shaped articles comprising re-used or scrap vulcanizate provide excellent mechanical properties even despite the simple SPM methods used to make the shaped articles.

Suitable vulcanizates can comprise, for example, ground tire rubber (GTR), styrene butadiene rubber (SBR), ethylene propylene-diene rubber (EPDM), butadiene rubber, natural rubber, mixtures thereof, and combinations thereof, including waste vulcanizates. Suitable waste vulcanizates can be obtained, for example, in shredded or milled form, or as cryogenically ground waste rubber. The waste rubber vulcanizate can comprise fillers and impurities, such as metal mesh fines.

Each shaped article layer may be made from 0 to 100 wt. %, based on total solids in the layer, of thermoplastic polymer encapsulated vulcanizate, such as 10 wt. % or more or 90 wt. % or less, with from 0 to 100 wt. %, such as 10 wt. % or more or 90 wt. % or less, of colored fluidizable particles or colored moist mixture including thermoplastic polymer encapsulated vulcanizate.

The shaped articles of the present invention may comprise 100 wt. % of colored fluidizable particles or colored moist mixture including thermoplastic polymer encapsulated vulcanizate in a single layer or article, or as a reflective layer of a laminate.

Preferably, the colored fluidizable particles or thermoplastic polymer encapsulated vulcanizate, i.e. as a moist mixture, comprise two or more colored thermoplastic polymer layers, in which one or more layer comprises infrared (IR) reflective pigment, for example, Cool Color™ or Eclipse™ IR reflective pigments from Ferro (Cleveland, Ohio); visibly reflective pigments having a refractive index in air of 1.7 or higher, e.g. red iron oxide; opacifying agent, for example, TiO2; or mixtures thereof. Opacifying agents may include any pigment or colorant that is visibly white in a dry film and has a refractive index in air of 1.7 or more; IR reflective pigments include any other pigment or colorant having a refractive index in air of 1.7 or more that reflect light in the infrared wavelength regions of 0.7 to 2.5 microns. Preferably, the first thermoplastic polymer layer contains an opacifying agent to enhance color reflectance Passivating agents useful in the present invention may include known multivalent metals or compounds, such as, for example, calcium hydroxide, sodium chloride or iron (ferric) chloride, i.e. $FeCl_3$, iron (ferrous) sulfate, i.e. $Fe_2(SO_4)_3$, alum, i.e. $Al_2(SO_4)_3$, magnesium sulfate, sodium aluminate, and mixtures thereof. Preferably, the passivating agent is calcium hydroxide or alum, or contains calcium, iron or aluminum.

In the present invention, passivating agents should be used in amounts such that they do not color or bleach the shaped articles or compositions made therefrom or impair melt flow and processing; however, they should be used in amounts such that they aid the coalescence of thermoplastic polymer around the vulcanizate and provide a passivating, anti-agglomeration effect. Passivating agents may be combined with an emulsion of a thermoplastic polymer, with vulcanizate particles during solid phase mixing, or, preferably, with a moist mixture of vulcanizate and thermoplastic polymer to complete formation of the moist mixture. Suitable amounts range from 0.05 to 3.0 wt. %, based on total solids, independently, in the encapsulated vulcanizate or the colored fluidizable particles, preferably, 0.1 wt. % or more, or, preferably, 1.0 wt. % or less or, more preferably, 0.8 wt. % or less.

To insure their effectiveness, passivating agents may be finely divided, so as to have a weight average particle size (determined by light scattering) of 600 μm or less, or, preferably, 400 μm or less, Coarser materials, such as alum, may be crushed or ground to a suitable particle size; or they may be dissolved in water or aqueous solvent.

To occlude the color of the encapsulated vulcanizate, which is usually black, in shaped composite articles, the shaped article comprises thermoplastically processed colored fluidizable particles or a colored moist mixture including thermoplastic polymer encapsulated vulcanizate. Colored fluidizable particles comprise vulcanizate encapsulated in a colored thermoplastic polymer which can be of any color so long as the colorant effectively opacifies the encapsulated vulcanizate. Accordingly, the colorant can be chosen from pigments and colorants having an index of refraction in air of 1.7 or higher, such as chromium oxide (green); opacifying agents that have an index of refraction in air of 1.7 or higher, such as $TiO_2$ (white); infrared (IR) reflective pigments, such as Ferro Green 24-10204 (Ferro, Cleveland, Ohio); visibly reflective pigments having a refractive index in air of 1.7 or higher, e.g. red iron oxide or metal oxides having a refractive index in air of 1.7 or higher; and organic color dispersions combined with opacifying agents, such as phthalo green color dispersion with TiO2.

Suitable opacifying agents may include, for example, titanium dioxide, zinc oxide, lithophone, antimony oxide, and hollow sphere or void containing polymer pigments.

In general, the amount of colorant in a reflective or colored shaped article or layer may range from 0.1 to 40 wt. %, based on total solids used to make the colored fluidizable particles, preferably, 1 wt. % or more, or, preferably, 5 wt. % or more, or, preferably, up to 25 wt. %.

In the present invention, suitable thermoplastic polymers may comprise urethanes, polyesters, silicon containing polymers, or, preferably, any acrylic or vinyl polymer, such as acrylic-styrene polymers or styrene polymers. Preferred acrylic or vinyl polymers may be chosen from any polymer comprising the reaction product of 25 wt. % or more of an acrylic monomer. More preferably, the acrylic or vinyl polymer may be chosen from a suspension copolymer, a polymer comprising the copolymerization product of a first acrylic or vinyl monomer having a measured glass transition temperature (Tg) of 20° C. or less with a copolymerizable monomer having a Tg at least 20° C. greater than the Tg of the first acrylic or vinyl monomer, and a metastable emulsion polymer, and mixtures thereof.

The thermoplastic polymer used to make the encapsulated vulcanizate and the colored fluidizable particles or encapsulated granules may be the same or different, and is, preferably, the same.

To achieve a balance of hardness and tensile properties in shaped articles made therefrom, such as shingles and films for roofing underlayment, with flexibility and cold weather resistance properties, thermoplastic polymers for the encapsulated vulcanizate may comprise the copolymerization product of a first acrylic or vinyl monomer having a measured glass transition temperature (Tg) of 20° C. or less, such as butyl acrylate (BA) or ethylhexyl acrylate (EHA), with a copolymerizable monomer having a Tg at least 20° C. greater than the Tg of the first acrylic or vinyl monomer, such as methyl methacrylate (MMA) or styrene.

For making shaped articles having high tensile strength, the encapsulated vulcanizate and, if desired, the colored fluidizable particles, may comprise thermoplastic polymer having a Tg of 20° C. (may want to restate this as a Tg value lower than 20 C or as a weight average Tg to encompass core shell polymers) or higher or be reinforced with scrim or fiber.

The shaped articles of the present invention may take the form of one composite layer of a reflective thermoplastic polymer encapsulated vulcanizate composition comprising colored fluidizable particles to make the shaped articles reflective. The colored fluidizable particles pack and form an aesthetically similar mottled granular look like asphaltic shingles, while at the same time significantly increasing Solar Reflectance Such a composite layer may optionally include reinforcing scrim, such as polyester, glass fiber, nylon or metal fiber woven or non-woven webs.

The shaped articles of the present invention are thermoplastic; so, the articles can be heat welded or laminated together with other similar articles or other plastic, metal, non-woven and woven layers. In one example, the shaped articles may comprise a top layer comprising thermoplastic processed colored fluidizable particles and encapsulated vulcanizate to make a reflective compose layer on with bottom layer comprising black encapsulated vulcanizate.

With granules, the shaped articles of the present invention can include a layer comprising black encapsulated vulcanizate, laminates thereof or encapsulated vulcanizate coated or scrim having colored fluidizable particles as granules pressed onto the top of the black layer or pressed into the black layer to form film, thereby creating a granule-free shaped article having a mottled appearance as if it had granules on it.

Where the shaped articles have granules or colored fluidizable particles pressed onto them, suitable granules for use in making the shaped articles of the present invention may comprise colored fluidizable particles, conventional inorganic granules, thermoplastic encapsulated roofing granules, or mixtures thereof.

Granules should be used to provide surface coverage to occlude the substrate underneath, for example, ranging from 0.04 $g/cm^2$ to 0.16 $g/cm^2$. Smaller granules of less than 800 μm sieve particle size cover more efficiently and may be used in amounts of up to 0.1 $g/cm^2$. Granules of a larger sieve particle size may be used in amounts of up to 0.16 $g/cm^2$ Preferably, to obtain better granule coverage, granules of two different particle sizes may be used, for example, a mixture of granules having a sieve particle size ratio of 1.5:1 or higher, and up to 15.0:1. Such a mixture may comprise from 1 to 99 weight parts, based on the total weight of granules, of the larger granules, or, preferably, from 30 to 70 weight parts, and from 1 to 99 weight parts, based on the total weight of granules, of the smaller granules, or, preferably, from 30 to 70 weight parts.

Suitable amounts of colorants depend on the vulcanizate particle size, and desired color effect, and cost. Organic colorants can be used in amounts of less than 5 wt. %, or as little as 0.1 wt. %, based on total solids in the colored fluidizable particles; however, to make an opaque encapsulating layer, the organic colorants of at least one layer of the colored fluidizable particle of the present invention are combined with opacifying agents, IR reflective pigments or other inorganic colorants having an index of refraction of 1.7 or higher, usually in a colorant dispersion, to render the organic colorants opacifying. The ratio of organic colorant to the opacifying agents, IR reflective pigments or inorganic colorants may range from 0.1:1 to 2:1, based on the total weight of colorant or pigment solids.

In solid phase mixing, colorants in powder form may be added directly to a thermoplastic polymer emulsion in the solids amounts indicated.

In solid phase mixing, when used in the form of a colorant dispersion, such as where organic colorants are used, the moist mixture used to form colored fluidizable particles may comprise such dispersions in the amount of from 0.3 to 50 wt. %, based on total solids in the moist mixture, preferably, 1 wt. % or more, or, preferably, up to 35 wt. %, or, preferably, 5 wt. % or more.

Nonionic surfactants and poly(meth)acrylic acid salt dispersants, e.g. Tamol™ dispersants (Dow Chemical Co., Midland, Mich.) which are sodium, potassium or ammonia neutralized (meth)acrylic acid (AA or MAA) polyacids or acid/copolymers, help to distribute colorants uniformly in an emulsion or dispersion.

Colored fluidizable particles or the moist mixture including thermoplastic polymer encapsulated vulcanizate useful to make them may have a single thermoplastic polymer layer which includes some opacifying agent or IR reflective inorganic oxide, optionally, combined with another colorant, such as a pigment or dye.

To enhance color and solar reflectance, colored fluidizable particles or moist mixture for making preferably have two or more thermoplastic polymer layers, such that they further comprise one or more opacifying agent in one or more intermediate thermoplastic polymer layer. In colored fluidizable particles having multiple thermoplastic polymer layers, each such layer comprises an opacifying agent, IR reflective pigment or other pigment having a refractive index of 1.7 or higher.

Examples of colored fluidizable particles having two or more thermoplastic polymer layers are colored fluidizable particles having one or more first or intermediate opaque thermoplastic polymer layer and an outer colored thermoplastic polymer layer; and solar and IR reflective fluidizable particles comprising one or more thermoplastic polymer layers each comprising infrared reflective pigment.

The colored fluidizable particles used to make the shaped articles may have a sieve particle size of from 50 to 4,000 µm.

In the vulcanizates used to make the colored fluidizable particles of the present invention, larger vulcanizate particle sizes increases amount of surface color which increases reflectivity and lowers raw material cost compared to smaller vulcanizate particle sizes, which may require cryogrinding. Accordingly, the preferred vulcanizate sieve particle size for use in colored fluidizable particles ranges from 200 to 1200 µm.

In addition, the preferred sieve particle size of colored fluidizable particles, from 200 to 1,200 µm, enables thicker shaped articles for roofing and enhanced reflectivity as a function of surface area coverage or concentration.

Smaller vulcanizate particles increase shingle tensile, elongation and tear resistance. Accordingly, the preferred sieve particle size for vulcanizate particles used to make the thermoplastic polymer encapsulated vulcanizates of the present invention, i.e. those not containing colorants, ranges from 45 to 800 µm.

The shaped articles may be formed by methods of solid phase mixing (SPM) comprising mixing the particles of one or more vulcanizate, preferably, a waste vulcanizate, such as ground tire rubber, and one or more emulsion of a thermoplastic polymer in the presence of one or more passivating agent to form a moist mixture, optionally, drying the moist mixture to form fluidizable particles, and thermoplastic processing either moist mixture or the fluidizable particles.

Fluidizable particles can be either colored fluidizable particles or encapsulated vulcanizate.

Following formation of the fluidizable particles, the process comprises thermoplastic processing a moist mixture of encapsulated vulcanizate particles or the fluidizable particles dried therefrom with, if desired, colored fluidizable particles to form a composite layer.

Mixing may comprise simple mixing at ambient temperature. To avoid agglomeration of the vulcanizate particles or partly or fully encapsulated vulcanizate particles, low shear mixers, e.g. Hobart mixers, Banbury mixers, and low-shear kneaders such as extruders with little or no heating may be used. Preferably, to enable mixing and drying, e.g. under devolatilization or vacuum at once, the methods comprise mixing in a ribbon mixer.

The moist mixture can be dried quickly at ambient temperature, preferably, in a fluid bed dryer. For example, drying may be carried out in a fluid bed dryer or in a vacuum oven, or by drying under vacuum and heat with agitation, such as in a ribbon mixer.

To prepare them for use in the methods of the present invention, the particles of vulcanizate may have been subject to grinding prior to mixing with an emulsion of thermoplastic polymer.

In the solid phase mixing methods of the present invention, the moist mixture can comprise as little as 5 wt. % liquid, e.g. water, based on the total weight of the moist mixture. Throughout the solid phase mixing of the present invention, the total solids of the moist mixture should be 60 wt. % or more, or, preferably, 70 wt. % or more, or, more preferably, 75 wt. % or more. Less drying time is needed for less moisture.

To make fluidizable particles (uncolored encapsulated vulcanizate or colored fluidizable particles) or moist mixtures for making them having a higher percentage of primary particles, two or more layers of thermoplastic polymer material can be deposited on a vulcanizate particle. Such methods comprise mixing fluidizable particles having one layer of thermoplastic polymer with one or more emulsion of a thermoplastic polymer comprising one or more pigment or opacifying agent in the presence of passivating agent, to form a moist mixture, followed by drying. Optionally, in the same manner of forming a moist mixture and drying, a third or fourth layer can be added to the resulting fluidizable particle having, respectively, two or three thermoplastic polymer layers, for example, two or more layers of colored opacifying or IR reflective thermoplastic polymer are desirable where a colored or solar and IR reflective fluidizable particles are desired.

Vulcanizate particle sizes can range as low as grinding and screening will make practicable and as high as will allow for thermoplastic processing to make shaped articles, such as films, with high melt strength and dimensionally consistent margins. Mechanical grinding is sufficient to reduce the vulcanizate to a sieve particle size of 300 to 800 µm. To make fluidizable particles having sieve particle size sizes of 200 µm or less, it is desirable to pre-grind the vulcanizate or use pre-ground, e.g. cryoground, vulcanizate particles. Cryogrinding is desirable to reduce vulcanizate to a smaller sieve particle size. To achieve smaller sieve particle sizes, a ground or cryoground sample can be screened to eliminate larger particle fractions.

For encapsulated vulcanizates, smaller particle sizes (800 µm sieve particle size or less) are preferred as they provide more surface area for coalescence of the thermoplastic polymer around the vulcanizate and, thereby, the thermoplastic polymer appears to more efficiently wet them than large sizes.

In one embodiment, the methods of making shaped articles comprises premixing emulsion of thermoplastic polymer, dispersant, and colorant, adding the total amount of vulcanizate and premixed latex into a mixing vessel, and mixing for 2 to 30 minutes. The premixed latex and vulcanizate are sufficiently mixed well after 5 minutes of mixing to form a moist mixture. To the moist mixture, adding a multivalent metal salt and mix for an additional 2 to 30 minutes, then transferring to a fluid bed dryer and drying. The thus formed encapsulated vulcanizate is in a form allowing for thermoplastic processing.

To form a reflective shaped article of the present invention having granules, the methods comprise pressing granules into the composite layer while still in heated molten state, similar to the way granules are applied and pressed into asphaltic shingles. Alternatively, granules can be adhered to the reflective or non-reflective composite layer using a thermoplastic polymer.

To combine solid phase mixing and thermoplastic processing in one step, extrusion can be used to form colored fluidizable particles and encapsulated vulcanizates, as well as shaped articles, such as by extruding in a devolatilizing extruder equipped with a devcolatilizing stage downstream of at least one kneading stage.

The surface of the encapsulated vulcanizate, colored fluidizable particles, or shaped articles therefrom, e.g. as sheets, exhibit good adhesion to various substrates including, but not limit to, polyester scrim, acrylic film, polyester backing, aluminum foil, fiberglass, polyester wovens and webs for use in making shingles and shingle mats.

The surface of shaped articles of the present invention exhibits good adhesion characteristics to water based coatings and adhesives. Such adhesion properties enable the simple formation of laminates, such as by coextrusion or contacting layers, or heat welding together sheets, scrims, webs and films of other materials wherein one or more of the layers comprises shapeable composite material of the present invention. Accordingly in the present invention, multilayer articles may be made by forming sheets or films and laminating the sheets or films with other sheets, films or lamina, wherein one or more layer comprises a thermoplastically processed product from the encapsulated vulcanizate and the colored fluidizable particles of the present invention. Further, shapeable composites made as articles can be thermoplastically reshaped and re-processed.

Compositions for use in thermoplastic processing may additionally comprise various additives as desired or required according to their end use, such as, for example, one or more of a vulcanizing agent, antioxidant, UV-stabilizer, polymeric, organic or inorganic fire-retardant, colorant, organic and inorganic filler, e.g. thermoset (cured) polymer or resin, in the form of, for example, powders, fibers, slivers or chips; reinforcing material, such as non-wovens, or scrims; pigment; thermosettable (curable) resin or polymer; processing aid, such as mold release agents; and small amounts of a surfactant. The additives can be added before or during thermoplastic processing.

To retain their thermoplastic nature during processing, the compositions of the present invention may omit crosslinking or curing agents, and thermosettable or curable resins or polymers. This does not mean that the compositions may not comprise functional groups that can be reacted with a separate matrix polymer or resin or emulsion polymer.

The shaped articles of the present invention may find use as roofing membranes or underlayment, roofing shingles, shingle mat or roofing felt; modified EPDM roofing membranes, and multilayer reflective articles for automotive and exterior uses, such as playground mulches.

EXAMPLES

The following examples illustrate the present invention.

In the Examples below, the following materials were used:

Latex A: styrene-butyl acrylate emulsion polymer having 43.5% solids and a measured Tg of ~5° C.;

Dispersant A: Polyacrylic acid sodium salt, Tamol™ 851, (Dow, Midland, Mich.);

$TiO_2$: Rutile titanic Dupont R-902 DuPont, Wilmington, Del.);

Ground tire rubber (GTR) A (500 µm part size; 34 mesh): (Edge Rubber, Chambersburg, Pa.); and, Calcium hydroxide, 98% (Fisher Scientific, Pittsburgh, Pa.).

In the following examples, the following test methods were used to measure solar reflectance and thermal emittance:

ASTM C1549-09 (2009) Standard Test Method for Determination of Solar Reflectance Near Ambient Temperature Using a Portable Solar Reflectometer, using a Devices and Services Portable Solar Reflectometer, Dallas, Tex. (calibrated before each use with reflectance standard, annual calibration by D&S, Dallas, Tex.).

ASTM C1371-04a (2004) Standard Test Method for Determination of Emittance of Materials Near Room Temperature Using Portable Emissometers, using a Devices and Services Portable Emissometer, Dallas, Tex. (calibrated before each use with emissivity standards).

Example 1

A comparison was made between a black sheet made from encapsulated vulcanizate (initial Solar Reflectance or SR 5%) and a reflective inventive sheet made from 100 wt. % of white colored colored/colored thermoplastic vulcanizate (initial SR 51%). To each of the black sheet and the reflective inventive sheet was adhered the same proportion 0.23 g/cm² of standard grey roofing granules. The inventive sheets were made by depositing the grey roofing granules on each sheet and pressing the granules into a heated sheet to make a shingle. The SR of the inventive white colored/colored thermoplastic vulcanizate shingle was 28% which was higher than the encapsulated vulcanizate pressed granule bearing analog, 25%. Additionally, reducing the amount of granules deposited on the surface of a sheet made from encapsulated vulcanizate reduces the SR reflectivity for the black sheet shingle and causes an increase in SR for the reflective sheet shingle made with colored/colored thermoplastic vulcanizate.

Example 2

Synthesis of Reflective Composite material

25% latex A (43.5% solids)/24% TiO$_2$/50% GTR A/0.7% Calcium hydroxide, 98%/0.3% Dispersant A (all on a weight basis and all are 100% solids, unless otherwise indicated)

Premixed were latex A, Dispersant, and TiO$_2$. The total amount of GTR A and premixed latex were charged into a 5 qt stainless steel mixing bowl and mixed for 5 minutes using a Hobart Mixer (Hobart Crop, Troy, Ohio). After the premixed latex and ground tire rubber were sufficiently mixed well (about 5 minutes of mixing), the Calcium hydroxide was added to latex/colorant/ground tire rubber mixture and mixed for an additional 5 minutes. The resulting high solids moist mixture was then transferred to a Retsch TG 200 (Retsch GmbH, Rheinische Str. 36, Germany) quick dryer (lab scale fluid bed dryer) and dried at 60° C. for 10 minutes. The completely dry colored fluidizable particles were in a physical form allowing for thermoplastic processing.

Example 3

Synthesis of Non-Reflective Composite Material

25% latex A/74.3% GTR (A)/0.7% Calcium hydroxide, 98% (all on a weight basis and all are 100% solids, unless otherwise indicated)

The total amount of ground tire rubber A and latex A were charged into the 5 qt. stainless steel mixing bowl and mixed for 5 minutes using a Hobart Mixer (Hobart Crop, Troy, Ohio). After the latex and ground tire rubber were sufficiently mixed, the Calcium hydroxide, 98% was added to the latex/ground tire rubber mixture and mixed for an additional 5 minutes. The resulting moist mixture is then transferred to a Retsch TG 200 (Retsch GmbH, Rheinische Str. 36, Germany) quick dryer (lab scale fluid bed dryer) and dried at 60° C. for 10 minutes. The resulting encapsulated vulcanizate was in a physical form allowing for thermoplastic processing.

Example 4

Thermoplastic Processing

To process, the colored fluidizable particles from Example 2 and encapsulated vulcanizate from Example 3 were pressed into a shingle plaque using compression molding at the following conditions: 4 minutes at 180° C. (356 F) and 68.947 Megapascal (10,000 psi). The resulting composite layers from each of Examples 2 and 3 were made as (i) shingle plaques free of granules; (ii) shingle plaques treated by applying latex A to the top surface of each plaque and sprinkling standard light gray shingle granules on top, followed by placing each plaque in a 60° C. oven for 30 minutes to dry the latex and adhere the granules to the plaque; and (iii) heating the top surface of each plaque by placing in a carver press (Carver Laboratory Hydraulic Press, Model C, Menomonee Falls, Wis.) for 2 minutes with the plates heated to 180° C. (356 F) and no pressure to soften the surface and then pressing standard light gray shingle granules into the surface with the carver press at a pressure of 6.895 Megapascal (1000 psi) for 30 seconds.

The solar reflectance and thermal emittance of the resulting shingles are

TABLE 1

Reflectance Test Data From Shingles

| Synthesis Example/ Thermoplastic Processing Example | Granule application | Latex | GTR | TiO$_2$ | % SR | % TE |
|---|---|---|---|---|---|---|
| 3*/4(i) | none | 25 | 74 | 0 | 4 | 83 |
| 3/4(iii) | pressed | 25 | 74 | 0 | 25 | 93 |
| 3/4(ii) | adhered | 25 | 74 | 0 | 27 | 93 |
| 2/4(i) | none | 25 | 50 | 24 | 51 | 86 |
| 2/4(iii) | pressed | 25 | 50 | 24 | 28 | 92 |
| 2/4(ii) | adhered | 25 | 50 | 24 | 29 | 93 |

*Control

As shown in Table 1, above, the inventive shingles exhibited a much higher Solar Reflectance reading, especially in the granule free composite shingle of Example 2/4(i). While granules can be used to provide some solar reflectance, Examples 3/4(iii) and 3/4(ii) and 2/4(iii) and 2/4(ii), the granules applied and adhering to a composite layer causes a more substantial improvement in thermal emittance.

Examples 5-8

Effect of Vulcanizate Sieve Particle Size

In Example 5, the materials from Example 2 were used and processed as in Example 4(i) except the GTR used had a sieve particle size of 177 μm (80 mesh).

In Example 6, the materials from Example 2 were used and processed as in Example 4(i).

In Example 7, the materials from Example 3 and processed as in Example 4(i).

In Example 8, the materials from Example 2 were used and processed as in Example 4(i), except the GTR used had a sieve particle size of 2,380 μm (8 mesh).

As shown in Table 2, below, in Examples 6 and 8 compared to Example 5, the larger the vulcanizate particle size, the higher the solar reflectance. Non-reflective shingles in Example 7 provided little solar reflectance.

TABLE 2

% SR And % TE Comparison Of Vulcanizate Mesh Size In Reflective Composite Sheets (No Granules)

| Example | Prep method used from above | GTR sieve particle size (μm) | % SR | % TE |
|---|---|---|---|---|
| 5 | A | 177 | 30 | 84 |
| 6 | A | 500 | 51 | 86 |
| 7* | B | 500 | 4 | 83 |
| 8 | A | 2,380 | 66 | 85 |

*Control

In Example 9, below, the materials from Example 3 were used and processed as in Example 4(ii) (latex gluing) except that the granules were colored fluidizable particles of GTR having a sieve particle size of 2,380 μm (8 mesh) encapsulated in latex A by solid phase mixing wherein the amount of GTR is 50 parts by weight as solids, the amount of latex is 24.6 parts by weight as solids, the colorant is 24.6 parts by weight as solids, and the passivating agent is 0.8 parts by weight as solids. GTR granules were used directly from the Retsch quick dryer.

TABLE 3

% SR And % TE of Non-Reflective Composite With Colored Fluidizable Particles Of Polymer TiO₂ Encapsulated GTR

| Example 9 | GTR sieve particle size | % SR | % TE |
|---|---|---|---|
| TIO2 colored GTR | 2380 μm | 56 | 88 |

As shown in Table 3, above, large vulcanizate particles in the colored fluidizable particles of the present invention provide granules that enable very high solar reflectance when adhered to composite layer shingles of the present invention.

Examples 10-16

In the following Examples, E80 is ground tire rubber from Edge Rubber (Chambersburg, Pa.), sieve particle size 177 μm; E34 is ground tire rubber from Edge Rubber (Chambersburg, Pa.), sieve particle size 500 μm (34 mesh); E8 is ground tire rubber from Edge Rubber (Chambersburg, Pa.), sieve particle size 2,380 μm; phthalo green colorant is an in-plant color dispersion (Aquatrend II disp. 878-5512, Degussa Corp, Piscataway, N.J.); TiO₂ is 100% solids rutile pigment; and Cr₂O₃ green pigment is 100% solids pigment.

In Examples 11, 12, 13 and 15, all of the GTR listed in Table 4, below was added to a mixing bowl; in a second step, about ⅓ latex was added and mixed, followed by adding ⅓ of the pigment (TiO₂ or Cr₂O₃) and mixing, then adding ⅓ of the passivating agent (Ca(OH)₂) and mixing to form a moist mixture; then the second step was repeated two more times to form a moist mixture of enlarged colored fluidizable particles which were then dried in a Retsch TG 200 (Retsch GmbH, Rheinische Str. 36, Germany) quick dryer (lab scale fluid bed dryer) and dried at 60° C. for 10 minutes.

In Example 14, all of the GTR listed in Table 4, below was added to a mixing bowl; in a second step, about ⅓ latex was added and mixed, followed by adding ½ of the pigment (TiO₂) and mixing, then adding ⅓ of the passivating agent (Ca(OH)₂) and mixing to form a moist mixture; then the second step was repeated one more times to form a moist mixture of enlarged colored fluidizable particles; to this was added ⅓ of the latex, followed by mixing, followed by adding the phthalo green colorant and mixing, and, finally adding ⅓ Ca(OH)₂ and mixing to form a moist mixture of enlarged colored fluidizable particles which were then dried in a Retsch TG 200 (Retsch GmbH, Rheinische Str. 36, Germany) quick dryer (lab scale fluid bed dryer) and dried at 60° C. for 10 minutes.

The color space of these colored fluidizable particles was measured and compared to powders of the control materials. As shown in Table 4, above, the colored fluidizable particles of the present invention reproduce the color of the colored thermoplastic polymer in the shell of the particles and not the color of the vulcanizate underneath.

TABLE 4

L.A.B. Color Space Values[2] For Colored Fluidizable Particles

| Example | Composition | L | A | B |
|---|---|---|---|---|
| 10* | 100 GTR (200 μm sieve particle size, 80 mesh) | "Too dark" for measurement | | |
| 11 | 24.5 latex A/25 TiO₂/50 E80/0.5 Ca(OH)2 | 64.10 | −1.12 | −3.85 |
| 12 | 24.5 latex A/25 TiO₂/50 E34/0.5 Ca(OH)2 | 78.01 | −1.31 | −0.11 |
| 13 | 24.5 latex A/25 TiO₂/50 E8/0.5 Ca(OH)2 | 84.52 | −1.22 | 4.29 |
| 14 | 24.5 latex A/23 TiO₂/2 phthalo green colorant/50 E80/0.5 Ca(OH)2 | 48.41 | −23.89 | −5.56 |
| 15 | 24.5 latex A/25 Cr₂O₃ green pigment/50 E80/0.5 Ca(OH)2 | 37.39 | −19.33 | 17.42 |
| 16* | Seafoam green, fine | 51.45 | −13.76 | −1.24 |

*Control; 1. Soft sand; 2. Minolta Chroma Meter CR-231 (Minolta Corp, Ramsey, NJ)

We claim:

1. A shaped article comprising (i) a composite layer of a vulcanizate encapsulated in a thermoplastic polymer matrix containing one or more passivating agents in amounts such that they do not color or bleach the shaped article, and (ii) a reflective material chosen from colored fluidizable particles of a thermoplastic reflective colorant encapsulated vulcanizate, roofing granules, a colored thermoplastic polymer matrix, and combinations thereof;
    wherein the colored fluidizable particles are dispersed within the surface of the composite layer or the colored fluidizable particles or the roofing granules are dispersed on the surface of the composite layer or are adhered thereto with a thermoplastic resin; and,
    further wherein, when the reflective material (ii) is the colored thermoplastic matrix, the composite layer (i) comprises black or non-colored thermoplastic polymer matrix.

2. The shaped article as claimed in claim 1, wherein the colored fluidizable particles or the colored thermoplastic polymer matrix comprise one or more colorant having a refractive index in air of 1.7 or higher.

3. The shaped article as claimed in claim 2, wherein the colored fluidizable particles comprise two or more colored thermoplastic polymer layers, in which one or more layer comprises an infrared (IR) reflective pigment, opacifying agent or visibly reflective pigment having a refractive index in air of 1.7 or more.

4. The shaped article as claimed in claim 1, wherein the passivating agent is a multivalent metal or compound.

5. The shaped article as claimed in claim 1, wherein the vulcanizate encapsulated in thermoplastic polymer is a waste vulcanizate.

6. The shaped article as claimed in claim 5, wherein the vulcanizate is ground tire rubber.

7. The shaped article as claimed in claim 1 which is a roofing shingle or a roof covering.

8. The shaped article as claimed in claim 7, wherein the initial Solar Reflectance (SR) of the shaped article is 30% or higher and the initial thermal emissivity (TE) is 70% or higher.

9. The shaped article as claimed in claim 1, which is at least substantially plasticizer free, or contains no added plasticizer.

10. A colored fluidizable particle or plurality thereof each particle comprising a shelf-stable particle of a vulcanizate encapsulated in a mixture of i) a thermoplastic polymer, ii) one or more colorant chosen from an infrared (IR) reflective pigment, a visibly reflective pigment and an opacifying pigment, and iii) a passivating agent, wherein the colored fluidizable particle is at least substantially plasticizer free, or contains no added plasticizer, and, further wherein the passivating agent is present in an amount such that it does not color or bleach the composition of the particle.

11. The colored fluidizable particle or plurality thereof of claim 10, wherein the vulcanizate encapsulated has a sieve particle size of from 40 to 1200 μm.

* * * * *